US012751890B2

(12) United States Patent
Ge et al.

(10) Patent No.: US 12,751,890 B2
(45) Date of Patent: Oct. 6, 2026

(54) TYPE OF FOOT MASSAGE PLATE

(71) Applicant: Huaian Mimir Electric Appliance Co., Ltd., Huai 'an (CN)

(72) Inventors: Jun Ge, Huai 'an (CN); Jianguo Chen, Huai 'an (CN)

(*) Notice: Subject to any disclaimer, the term of this patent is extended or adjusted under 35 U.S.C. 154(b) by 317 days.

(21) Appl. No.: 18/773,211

(22) Filed: Jul. 15, 2024

(65) Prior Publication Data

US 2025/0367062 A1 Dec. 4, 2025

(30) Foreign Application Priority Data

Jun. 4, 2024 (CN) ........................ 202410714095.7

(51) Int. Cl.
*A61H 15/00* (2006.01)

(52) U.S. Cl.
CPC . *A61H 15/0078* (2013.01); *A61H 2015/0021* (2013.01); *A61H 2201/123* (2013.01); *A61H 2205/12* (2013.01)

(58) Field of Classification Search
CPC ................ A61H 15/00; A61H 15/0007; A61H 15/0014; A61H 15/0021; A61H 15/0078; A61H 2015/0007; A61H 2015/0014; A61H 2015/0021; A61H 2015/0042; A61H 2015/005; A61H 2201/123; A61H 2201/164; A61H 2201/1215; A61H 2201/1207; A61H 2205/00; A61H 2205/12; A61H 2205/125; A61H 23/00; A61H 23/02; A61H 23/0254
See application file for complete search history.

(56) References Cited

U.S. PATENT DOCUMENTS 2,534,412 A * 12/1950 Burnett .............. A61H 15/0078 74/86
2,577,129 A * 12/1951 Johnston ................ A61H 15/00 492/30
2,582,686 A * 1/1952 Benjamin .............. A61H 15/00 601/118

(Continued)

FOREIGN PATENT DOCUMENTS

CN 115337197 A * 11/2022 ........... A61H 35/006
EP 4706624 A1 * 3/2026 ............. A61H 7/007

OTHER PUBLICATIONS

Machine translation of written description and claims of CN115337197A via espacenet (Year: 2022).*

*Primary Examiner* — Bradley H Philips
*Assistant Examiner* — Tyler A Raubenstraw

(57) ABSTRACT

A type of foot massage plate, comprising a bottom shell, an upper shell, a gear box, a power mechanism, first gear transmission mechanisms, and a second gear transmission mechanism, wherein the upper shell is mounted on the bottom shell by screws; the upper shell is provided with a mounting groove, and the gear box is installed in the mounting groove; the gear box is symmetrically provided with two first gear transmission mechanisms, and the middle part of the gear box is provided with a second gear transmission mechanism; the second gear transmission mechanism drives the two first gear transmission mechanisms to operate. The massage rollers reciprocate in a straight line back and forth, which can massage the entire foot sole, and the massage effect is better. The user does not need to move, which can make the user relax better.

6 Claims, 10 Drawing Sheets

(56) References Cited

U.S. PATENT DOCUMENTS

| | | | | |
|---|---|---|---|---|
| 2,663,293 | A * | 12/1953 | Elliott | A61H 15/0078 601/121 |
| 5,674,185 | A * | 10/1997 | Chang | A61H 15/00 601/128 |
| 5,772,615 | A * | 6/1998 | Elder | A61H 15/0078 601/102 |
| 5,797,859 | A * | 8/1998 | Prehodka | A61H 7/004 601/87 |
| 9,446,288 | B1 * | 9/2016 | Pazan | A63B 24/0087 |
| 2007/0129654 | A1 * | 6/2007 | Anderson, Jr. | A61H 15/00 601/134 |
| 2010/0087302 | A1 * | 4/2010 | Fukunaga | A61H 1/0292 482/146 |
| 2010/0280426 | A1 * | 11/2010 | Tsai | A61H 15/0078 601/134 |
| 2012/0246820 | A1 * | 10/2012 | Huynh | A61H 35/006 4/524 |
| 2013/0345609 | A1 * | 12/2013 | Miller | A61H 15/00 601/120 |
| 2015/0057584 | A1 * | 2/2015 | Chen | A61H 39/04 601/99 |
| 2017/0360650 | A1 * | 12/2017 | DiBenedetto | A61H 15/00 |
| 2018/0104095 | A1 * | 4/2018 | Kamat | A61F 7/0241 |
| 2019/0133875 | A1 * | 5/2019 | Choi | A61H 7/004 |
| 2020/0330318 | A1 * | 10/2020 | Chou | A61H 1/00 |
| 2022/0241143 | A1 * | 8/2022 | Ann | A61H 1/008 |
| 2022/0409476 | A1 * | 12/2022 | Du | A61H 15/0078 |
| 2023/0099848 | A1 * | 3/2023 | Hsieh | A61H 7/007 601/51 |
| 2023/0172791 | A1 * | 6/2023 | Madvin | A61N 1/14 601/134 |
| 2023/0248607 | A1 * | 8/2023 | Chen | A61H 39/04 601/99 |
| 2024/0315915 | A1 * | 9/2024 | Wu | A61H 15/00 |
| 2024/0423419 | A1 * | 12/2024 | Ge | A47K 3/022 |
| 2025/0281353 | A1 * | 9/2025 | Wu | A61H 23/0263 |
| 2025/0367062 | A1 * | 12/2025 | Ge | A61H 15/0078 |

* cited by examiner

TYPE OF FOOT MASSAGE PLATE

TECHNICAL FIELD

The invention relates to the technical field of foot massage plates, in particular to a type of foot massage plate.

BACKGROUND ART

The proportion of sub-healthy people in today's cities is high, most people are in a state of excessive fatigue, and there are very few people who are truly "healthy". Among high-income people such as office workers, the trend of "biological age" over-age is obviously accelerating, coupled with busy work, so we are facing very serious health problems. The feet soles are known as the second heart of the human body, and the health of the soles of the feet cannot be ignored.

Most of the leg and foot massagers on the market currently use air bags to squeeze and massage the feet or rollers to roll and press the feet soles. For roller massage, the existing technology generally either fixes the roller, then puts the foot on the roller, and moves the foot back and forth to massage the sole of the foot, and this is tired for the user and does not achieve a relaxing effect, or uses a power structure to drive the roller or ball to rotate in place to massage the sole of the foot; this can only massage a fixed point and cannot massage the entire foot sole; if the entire foot sole needs to be massaged, the foot sole needs to be moved back and forth, which will also make the user more tired, and the massage effect is not good.

Therefore, a type of foot massage plate is urgently needed for the technical problems described hereinabove.

SUMMARY OF THE INVENTION

The technical problem to be solved by the invention is to overcome the defects of the above technology and provide a type of foot massage plate.

In order to solve the above technical problems, the technical solution provided by the invention is a type of foot massage plate, comprising:

a bottom shell, an upper shell, a gear box, a power mechanism, first gear transmission mechanisms, and a second gear transmission mechanism, wherein the upper shell is mounted on the bottom shell by screws; the upper shell is provided with a mounting groove, and the gear box is installed in the mounting groove; the gear box is symmetrically provided with two first gear transmission mechanisms, and the middle part of the gear box is provided with a second gear transmission mechanism; the second gear transmission mechanism drives the two first gear transmission mechanisms to operate; the middle part of the lower end of the upper shell is rotatably provided with a transmission shaft, and the lower end of the upper shell is provided with a power mechanism; the transmission shaft extends into the mounting groove, then extends into the gear box and is connected to the second gear transmission mechanism; the power mechanism drives the second gear transmission mechanism to operate through the transmission shaft; the upper end of the upper shell is provided with a controller;

the first gear transmission mechanism comprises a fixing seat, U-shaped brackets, main gears, and massage rollers; the fixing seat is provided on the top of the gear box; the fixing seat is symmetrically provided with main gears, and the upper end of the main gear is provided with a rotating shaft; the fixing seat is symmetrically provided with shaft holes, and the main gear is rotatably connected to the shaft hole through the rotating shaft; the upper end of the main gear is provided with an eccentric circular groove; the upper end of the fixing seat is symmetrically provided with notches penetrating the fixing seat, and both sides of the shaft hole at the upper end of the fixing seat are symmetrically provided with sliding grooves; the U-shaped brackets are symmetrically arranged above the fixing seat; the lower end of the U-shaped bracket is provided with a circular shaft, and one end of the circular shaft extends from the corresponding notch to the corresponding eccentric circular groove; the lower end of the U-shaped bracket is symmetrically provided with limiting sliding bars, and the limiting sliding bars are slidably matched with the corresponding sliding grooves; the main gear drives the U-shaped brackets to reciprocate along the sliding grooves through the cooperation of the eccentric circular groove and the circular shaft; the upper end of the U-shaped bracket is rotatably provided with a massage roller.

As an improvement, the second gear transmission mechanism comprises a middle gear and side gears; the middle gear is rotatably arranged in the middle of the top of the gear box, and the upper end of the transmission shaft is connected to the middle gear; both sides of the middle gear at the top of the gear box are symmetrically provided with side gears, and the side gears are rotatably connected to the gear box; the side gear on each side is meshed with the two main gears on the side corresponding to the fixing seat.

As an improvement, the upper end of the upper shell is symmetrically provided with frame bodies, and both ends of the frame body are symmetrically provided with long-strip grooves penetrating the frame body; the two straight plates of the U-shaped bracket extend from the two long-strip grooves symmetrically arranged at the corresponding ends of the frame body; the massage rollers are located on the upper part of the frame body.

The advantages of the invention compared with the prior art are: 1. the invention is provided with a power mechanism, first gear transmission mechanisms, and a second gear transmission mechanism; the power mechanism drives the second gear transmission mechanism to rotate, and the second gear transmission mechanism drives the main gear in the first gear transmission mechanism to rotate. Since an eccentric circular groove is provided at the upper end of the main gear, the limiting sliding bar at the lower end of the U-shaped bracket and the sliding groove on the fixing seat slide in cooperation, so that the main gear drives the U-shaped bracket to reciprocate along the sliding groove in a straight line through the cooperation of the eccentric circular groove and the circular shaft, so that the foot sole placed on the massage rollers can be massaged by the massage rollers; moreover, the massage rollers reciprocate in a straight line back and forth, which can massage the entire foot sole, and the massage effect is better. The user does not need to move, which can make the user relax better.

2. The transmission of the second gear transmission mechanism can make the movement of the four main gears synchronous, thereby achieving the synchronous movement of the massage rollers.

3. The upper end of the upper shell is symmetrically provided with frame bodies, which can limit the U-shaped bracket, restrict the U-shaped bracket inside the frame body, and prevent the U-shaped bracket from deviating from the preset motion trajectory.

Figure 1:
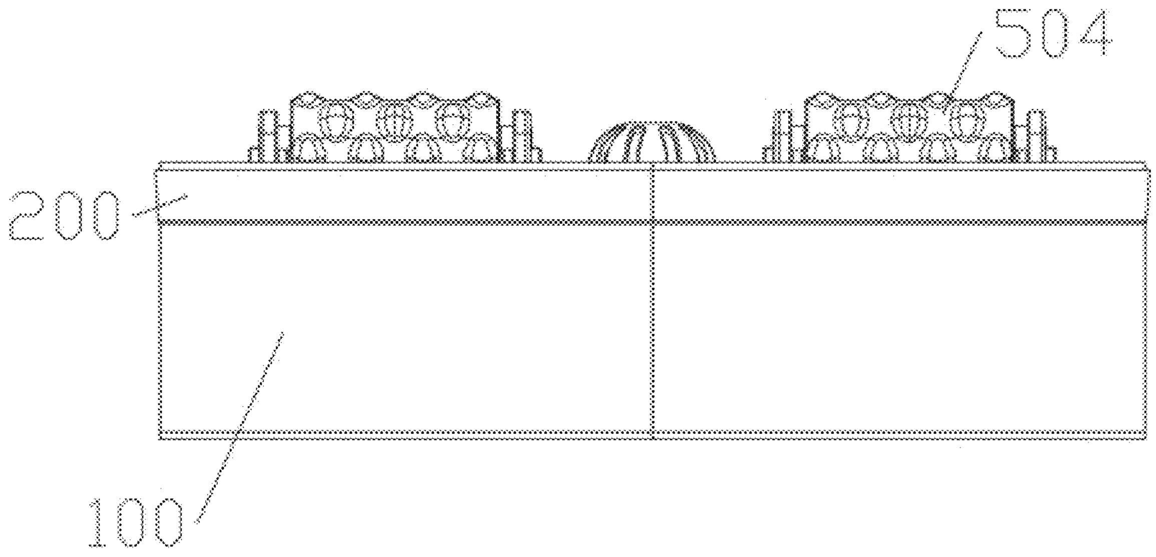
FIG. 1 is a front view of the type of foot massage plate according to the invention.

100 refers to the bottom shell; 200 refers to the upper shell; 201 refers to the mounting groove; 202 refers to the frame body; 203 refers to the long-strip groove; 204 refers to the transmission shaft; 300 refers to the gear box; 400 refers to the motor; 401 refers to the motor transmission worm gear; 402 refers to the worm; 501 refers to the fixing seat; 502 refers to the U-shaped bracket; 503 refers to the main gear; 504 refers to the massage roller; 505 refers to the rotating shaft; 506 refers to the shaft hole; 507 refers to the eccentric circular groove; 508 refers to the notch; 509 refers to the sliding groove; 510 refers to the circular shaft; 511 refers to the limiting sliding bar; 601 refers to the middle gear; 602 refers to the side gear; 700 refers to the controller.

SPECIFIC EMBODIMENT OF THE INVENTION

In order to make the objectives, technical solutions, and advantages of the embodiments of the invention clearer, the technical solutions in the embodiments of the invention will be described clearly and completely hereinafter with reference to the drawings in the embodiments of the invention. Obviously, the described embodiments are part of the embodiments of the invention, rather than all of the embodiments. The components of the embodiments of the invention generally described and illustrated in the drawings herein may be arranged and designed in various different configurations.

Figure 2:
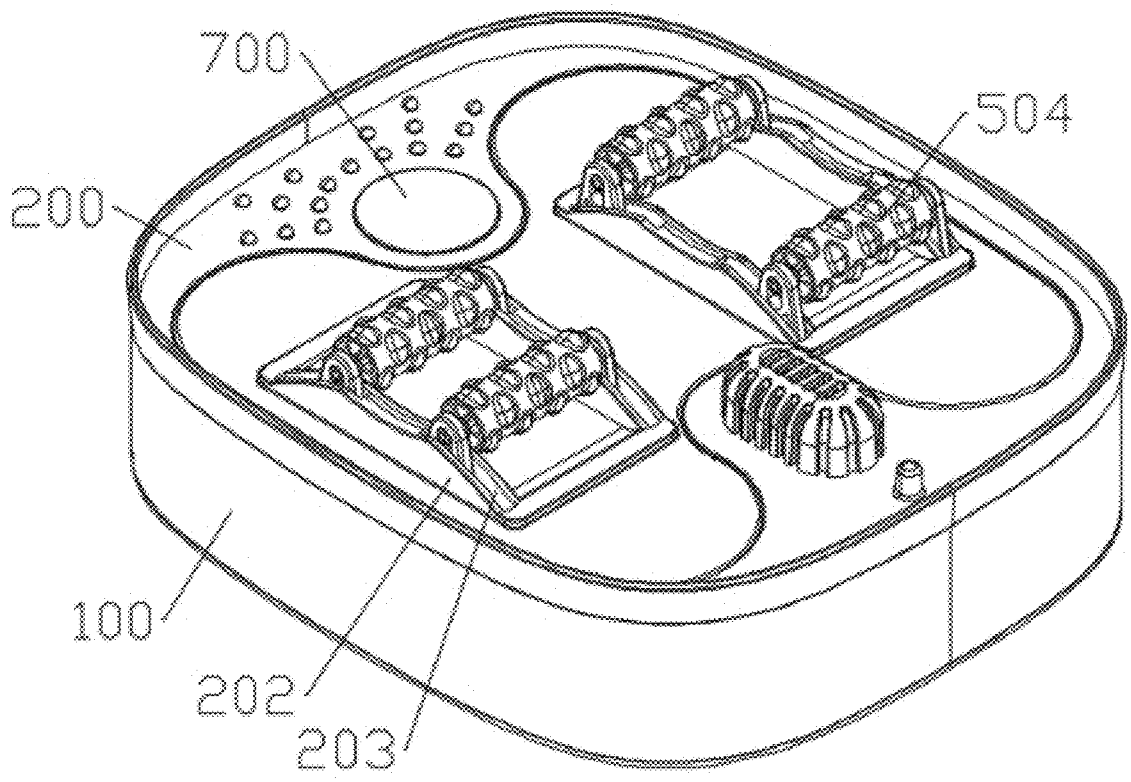
FIG. 2 is a schematic diagram of the three-dimensional structure of the type of foot massage plate according to the invention.
Figure 3:
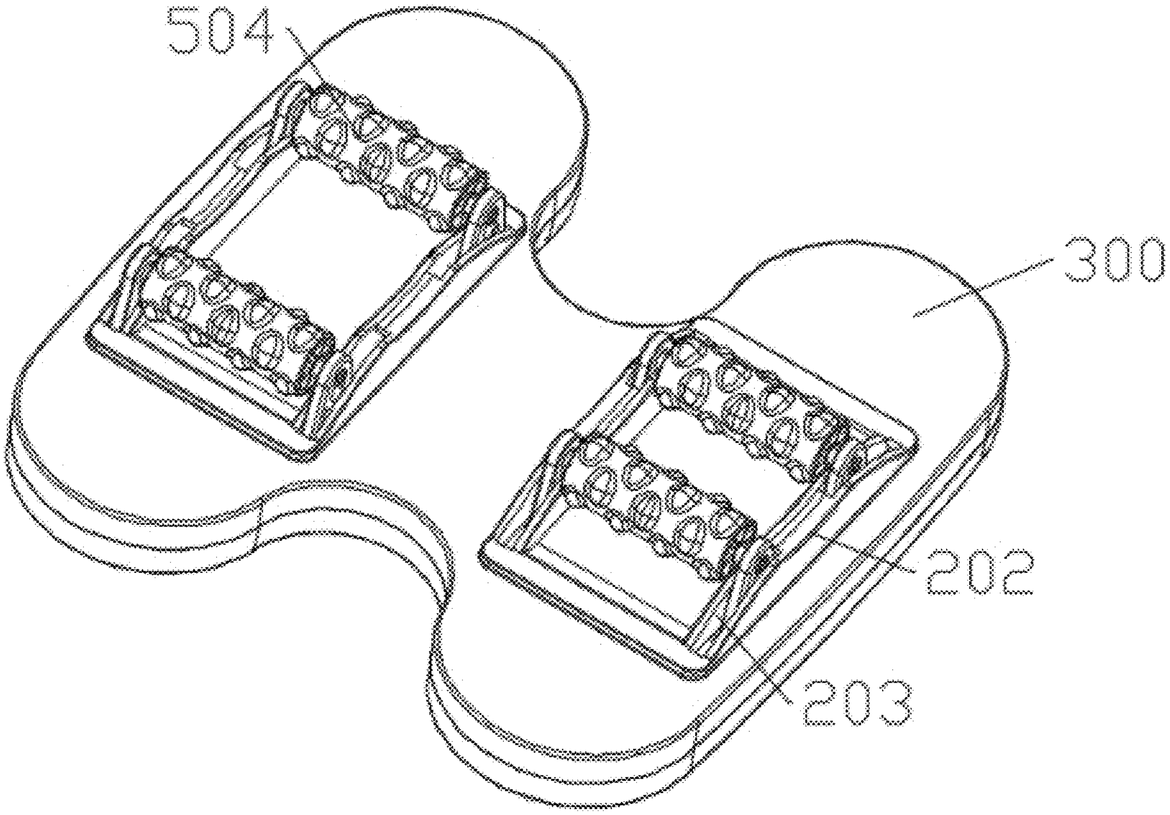
FIG. 3 is a schematic structural diagram of the gear box in the type of foot massage plate according to the invention.
Figure 4:
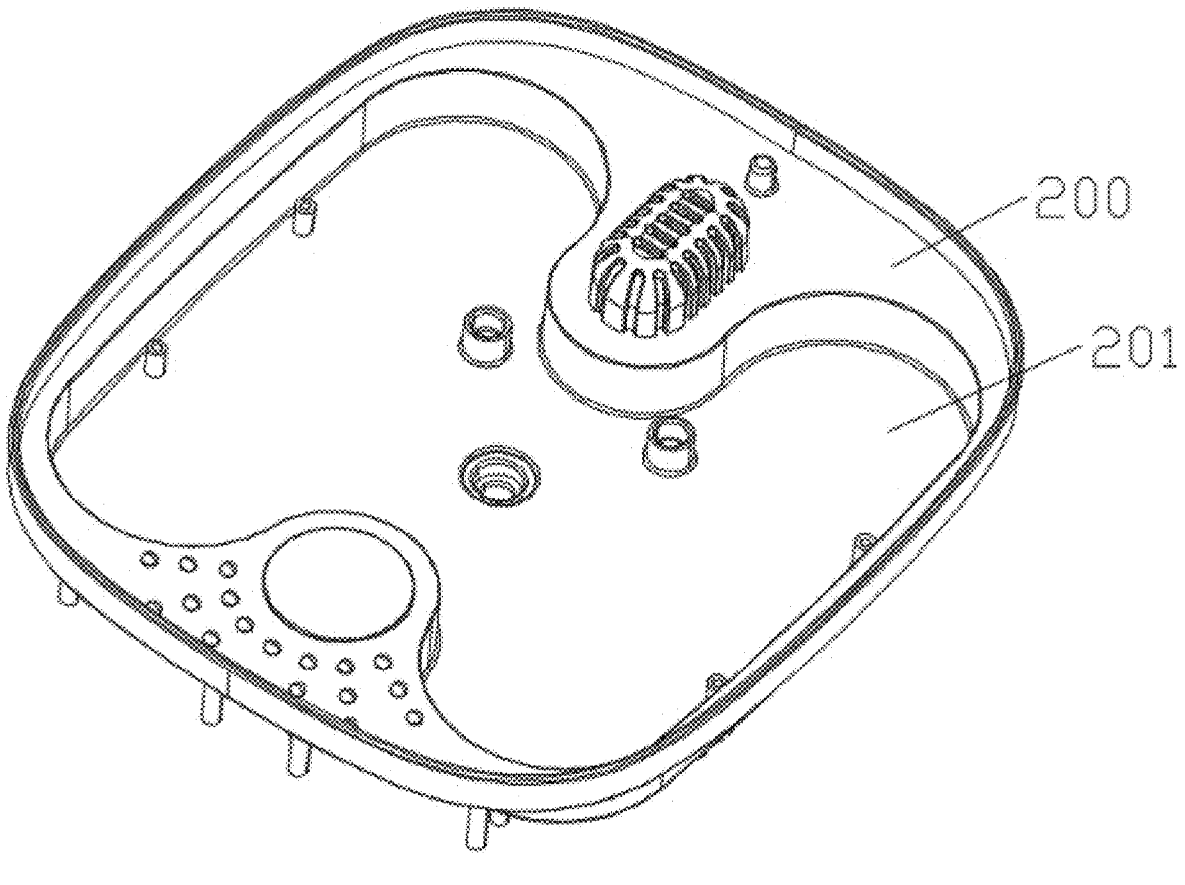
FIG. 4 is a schematic diagram of the top structure of the upper shell in the type of foot massage plate according to the invention.
Figure 5:
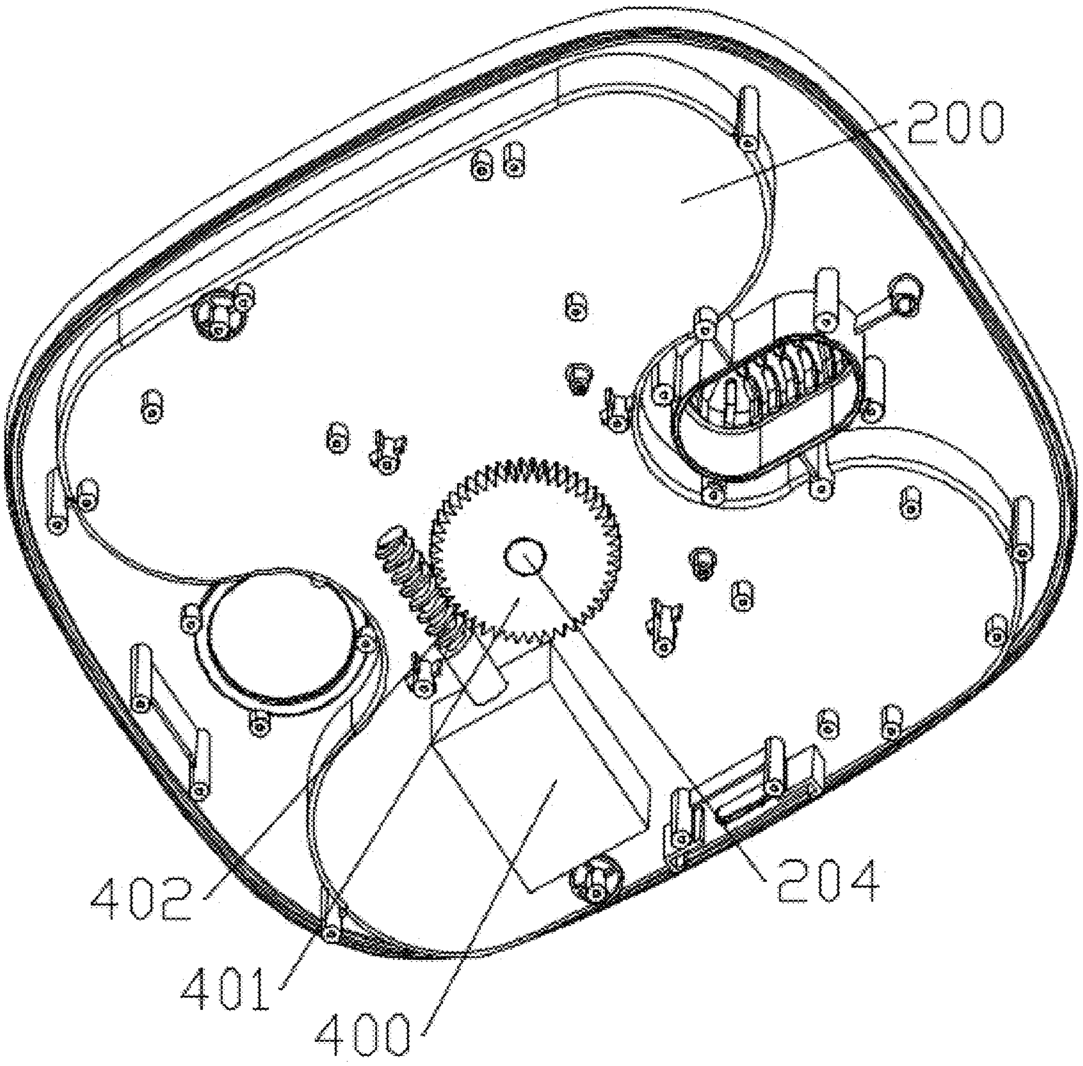
FIG. 5 is a schematic diagram of the bottom structure of the upper shell in the type of foot massage plate according to the invention.
Figure 6:
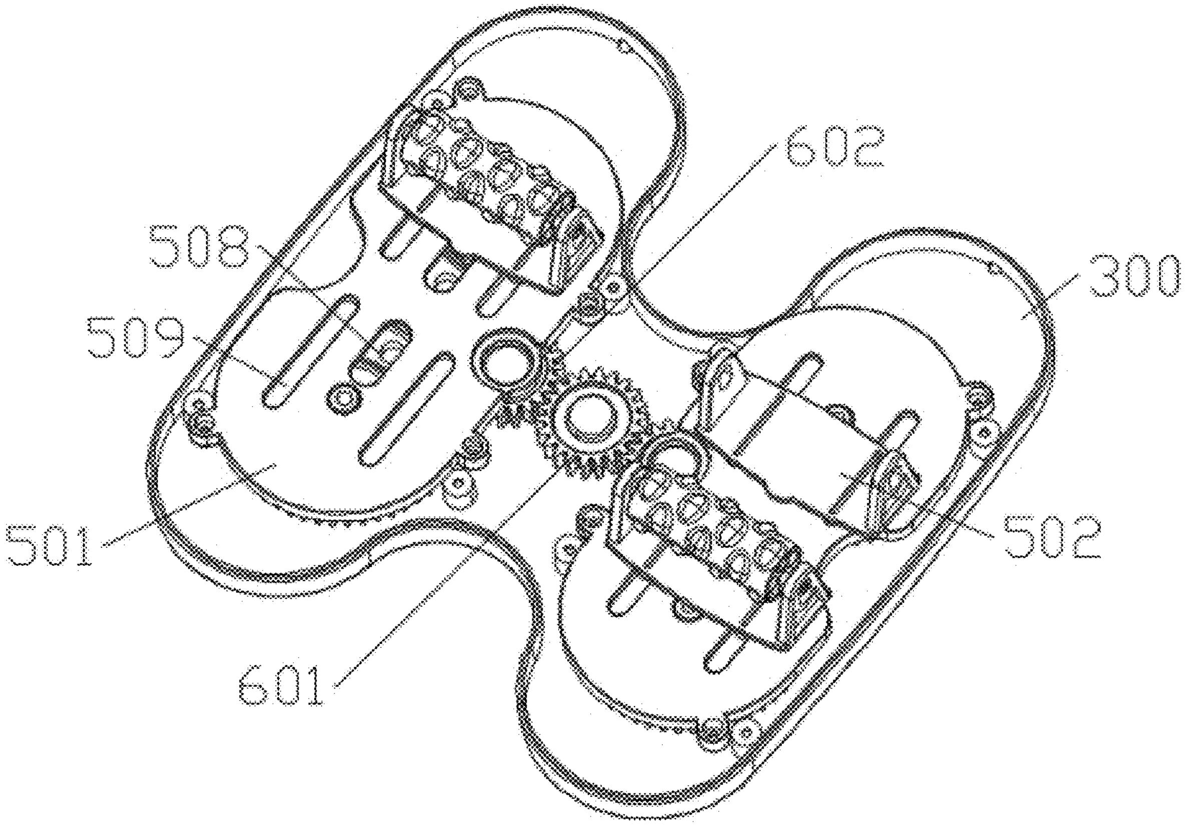
FIG. 6 is a schematic diagram of the internal structure of the gear box in the type of foot massage plate according to the invention.
Figure 7:
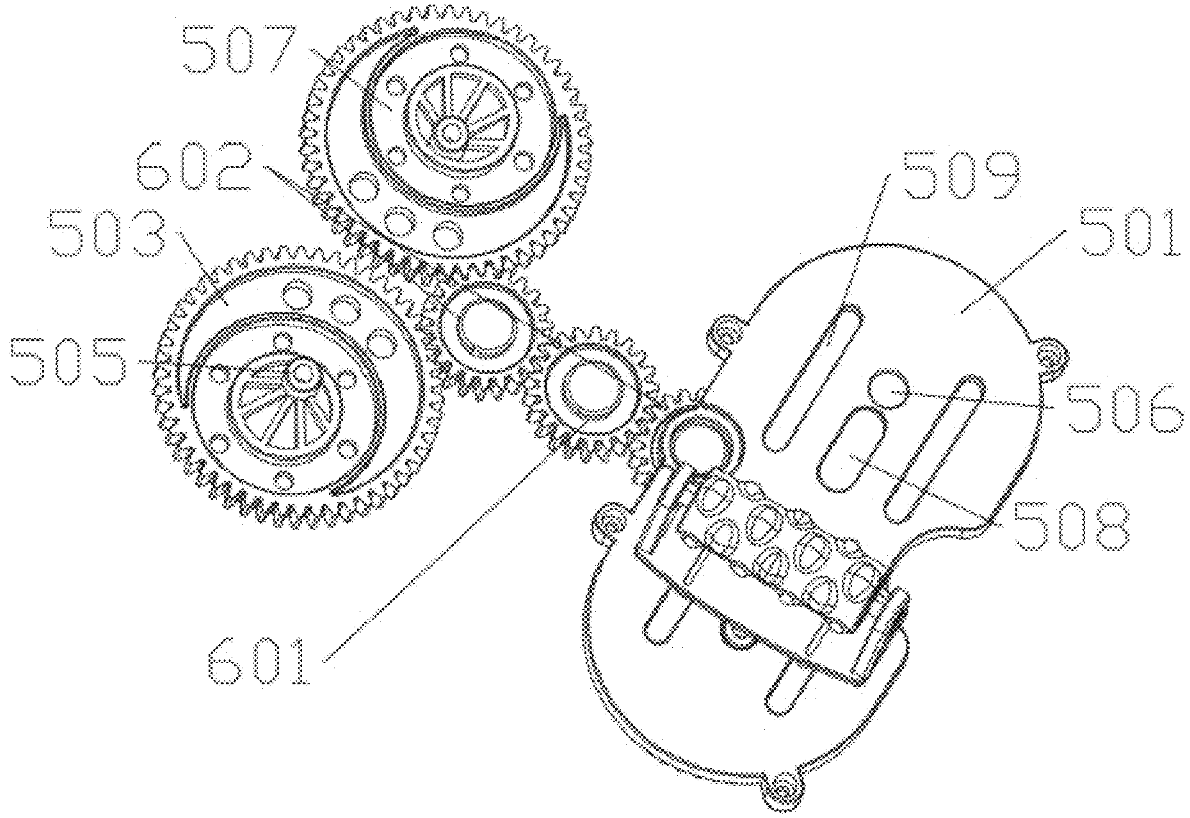
FIG. 7 is a schematic diagram of the three-dimensional structure of the first gear transmission mechanism in the type of foot massage plate according to the invention.
Figure 8:
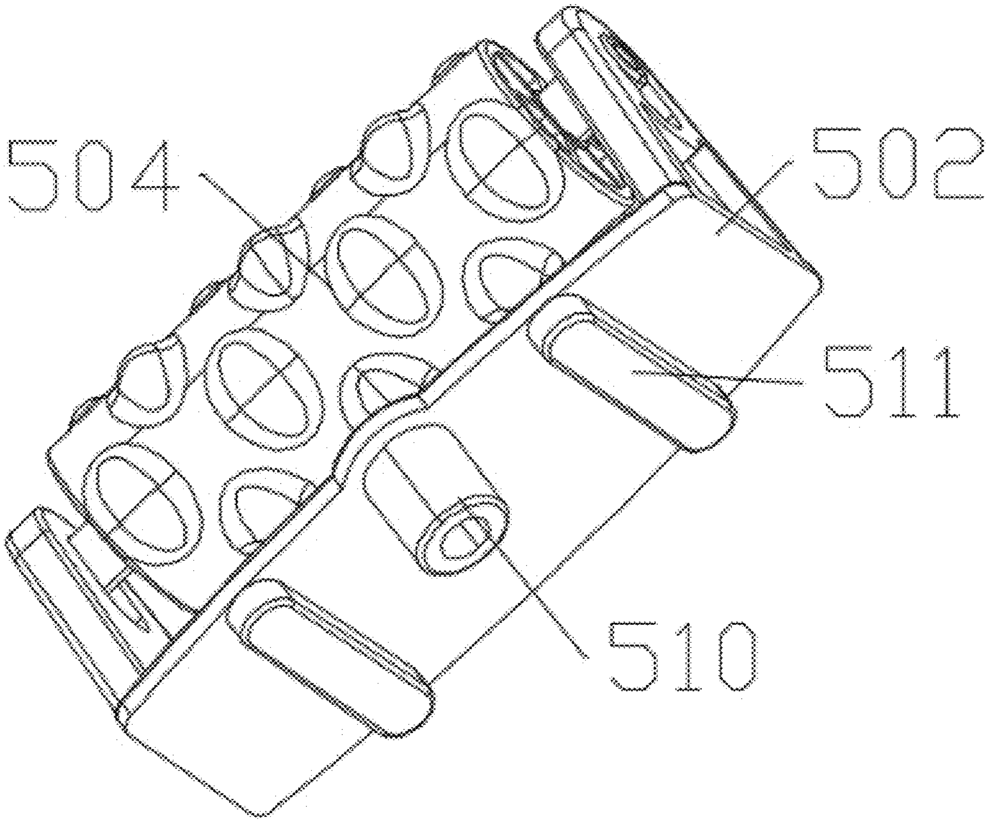
FIG. 8 is a schematic diagram of the U-shaped bracket in the type of foot massage plate according to the invention.
Figure 9:
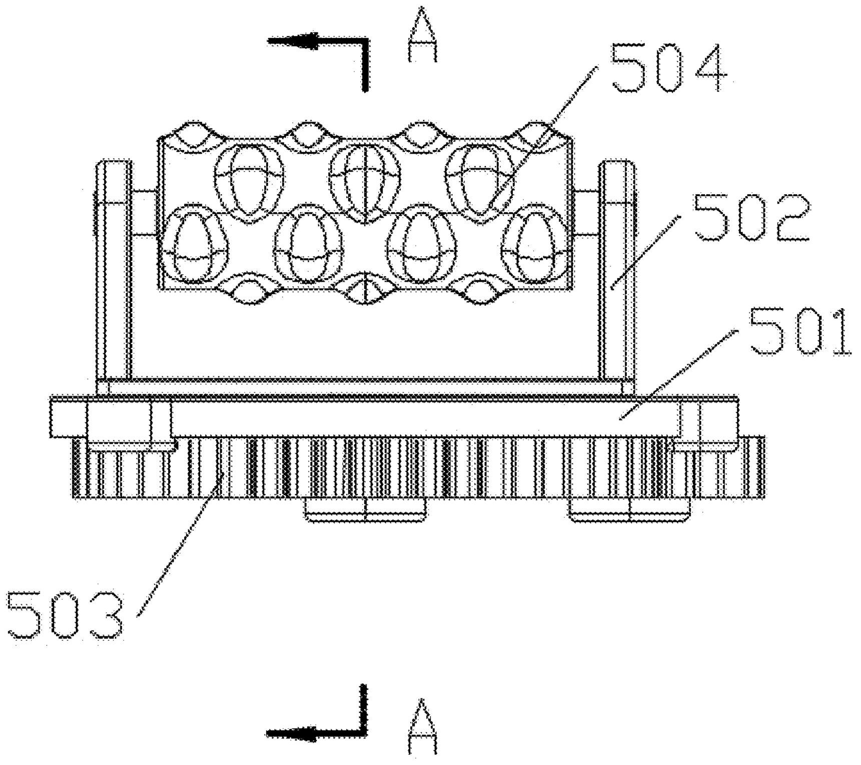
FIG. 9 is a front view of the first gear transmission mechanism in the type of foot massage plate according to the invention.
Figure 10:
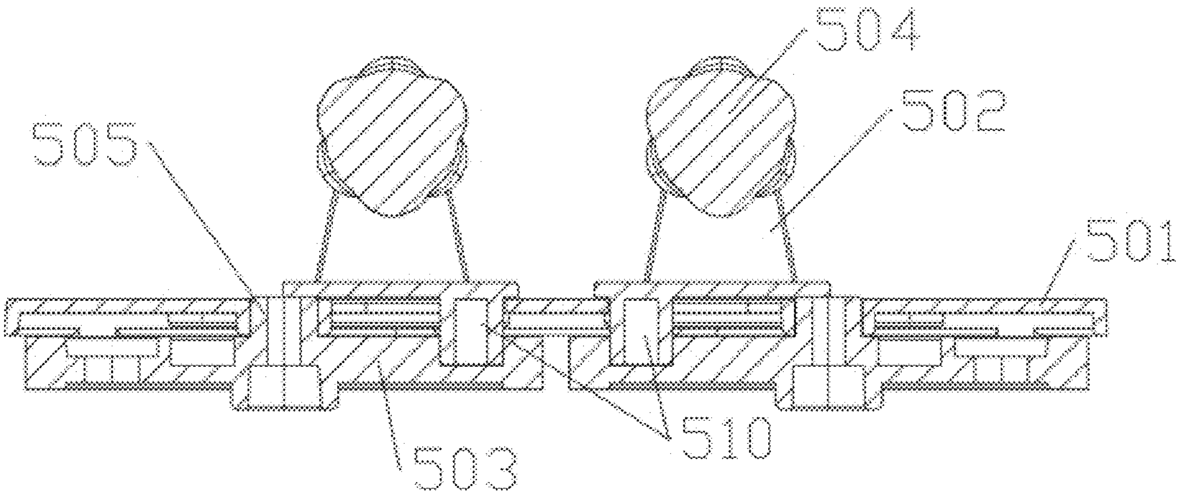
FIG. 10 is a cross-sectional view of part A-A in FIG. 9.

With reference to FIGS. 1-10, a type of foot massage plate, comprising:

a bottom shell 100, an upper shell 200, a gear box 300, a power mechanism, first gear transmission mechanisms, and a second gear transmission mechanism, wherein the upper shell 200 is mounted on the bottom shell 100 by screws; the upper shell 200 is provided with a mounting groove 201, and the gear box 300 is installed in the mounting groove 201; the gear box 300 is symmetrically provided with two first gear transmission mechanisms, and the middle part of the gear box 300 is provided with a second gear transmission mechanism; the second gear transmission mechanism drives the two first gear transmission mechanisms to operate; the middle part of the lower end of the upper shell 200 is rotatably provided with a transmission shaft 204, and the lower end of the upper shell 200 is provided with a power mechanism; the transmission shaft 204 extends into the mounting groove 204, then extends into the gear box 300 and is connected to the second gear transmission mechanism; the power mechanism drives the second gear transmission mechanism to operate through the transmission shaft 204; the upper end of the upper shell 200 is provided with a controller 700; the operation of the foot massage plate is controlled by the controller 700;

the first gear transmission mechanism comprises a fixing seat 501, U-shaped brackets 502, main gears 503, and massage rollers 504; the fixing seat 501 is provided on the top of the gear box 300; the fixing seat 501 is symmetrically provided with main gears 503, and the upper end of the main gear 503 is provided with a rotating shaft 505; the fixing seat 501 is symmetrically provided with shaft holes 506, and the main gear 503 is rotatably connected to the shaft hole 506 through the rotating shaft 505; the lower end of the main gear 503 is rotatably connected to the bottom of the gear box 300; the upper end of the main gear 503 is provided with an eccentric circular groove 507; the upper end of the fixing seat 501 is symmetrically provided with notches 508 penetrating the fixing seat 501, and the notches 508 are located inside the shaft hole 506; both sides of the shaft hole 506 at the upper end of the fixing seat 501 are symmetrically provided with sliding grooves 509; the U-shaped brackets 502 are symmetrically arranged above the fixing seat 501; the lower end of the U-shaped bracket 502 is provided with a circular shaft 510, and one end of the circular shaft 510 extends from the corresponding notch 508 to the corresponding eccentric circular groove 507; the lower end of the U-shaped bracket 502 is symmetrically provided with limiting sliding bars 511, and the limiting sliding bars 511 are slidably matched with the corresponding sliding grooves 509; the sliding grooves 509 limit the limiting sliding bars 511, restricting the limiting sliding bars 511 to slide only in the sliding grooves 509; the main gear 503 drives the U-shaped brackets 502 to reciprocate along the sliding grooves 509 through the cooperation of the eccentric circular groove 507 and the circular shaft 510; the upper end of the U-shaped bracket 502 is rotatably provided with a massage roller 504.

The second gear transmission mechanism comprises a middle gear 601 and side gears 602; the middle gear 601 is rotatably arranged in the middle of the top of the gear box 300, and the upper end of the transmission shaft 204 is connected to the middle gear 601 to drive the middle gear 601 to rotate; both sides of the middle gear 601 at the top of the gear box 300 are symmetrically provided with side gears 602, and the side gears 602 are rotatably connected to the gear box 300; the side gear 602 on each side is meshed with the two main gears 503 on the side corresponding to the fixing seat 501, so that the four main gears 503 can be driven to rotate synchronously through the middle gear 601, thereby achieving synchronous movement of the massage rollers 504.

The upper end of the upper shell 200 is symmetrically provided with frame bodies 202, and both ends of the frame body 202 are symmetrically provided with long-strip grooves 203 penetrating the frame body 202; the two straight plates of the U-shaped bracket 502 extend from the two long-strip grooves 203 symmetrically arranged at the corresponding ends of the frame body 202, which can limit the U-shaped bracket 502, restrict the U-shaped bracket 502 inside the frame body 202, and prevent the U-shaped bracket 502 from deviating from the preset motion trajectory; the massage rollers 504 are located on the upper part of the frame body 202, so that the foot sole can be placed on the massage rollers 504 for massage.

The power mechanism comprises a motor 400 and a motor transmission worm gear 401; the motor transmission worm gear 401 is installed at the lower end of the transmission shaft 204, and the motor 400 is arranged at the lower end of the upper shell 200; the shaft of the motor 400 is provided with a worm 402, and the worm 402 is meshed with the motor transmission worm gear 401.

When the invention is in specific implementation, place the device on the ground and start the motor 400, the motor 400 drives the motor transmission worm gear 401 to rotate through the worm 402, and drives the middle gear 601 to rotate through the transmission shaft 204. The middle gear 601 drives the side gear 602 to rotate, and the side gear 602 drives the four main gears 503 to rotate. The main gear 503 drives the circular shaft 510 to rotate through the eccentric circular groove 507. Since the limiting sliding bars 511 are slidably matched with the corresponding sliding grooves 509, the sliding grooves 509 limits the position of the U-shaped bracket 502, thereby driving the massage rollers 504 to make a linear reciprocating motion along the sliding grooves 509, thereby driving the massage rollers 504 to make a linear reciprocating motion, and the foot sole placed on the massage rollers 504 can be massaged, and the massage rollers 504 will move back and forth on the foot sole, thereby achieving an all-round massage of the entire foot sole.

In the description of the invention, it needs to be understood that the orientation or positional relationship indicated by the terms "center", "up", "down", "left", "right", "vertical", "horizontal", "inner", "outer", etc. are based on the orientation or positional relationship shown in the drawings, which are only for the convenience of describing the invention and simplifying the description, rather than indicating or implying that the device or element referred to must have a specific orientation, be constructed and operated in a specific orientation, and therefore cannot be understood as a limitation of the invention. In addition, the terms "first", "second", and "third" are only used for descriptive purposes, and cannot be understood as indicating or implying relative importance or implicitly indicating the number of indicated technical features.

In addition, the terms "horizontal", "vertical", "dangling", etc. do not mean that the component is required to be absolutely horizontal or hanging, but may be slightly inclined. For example, "horizontal" only means that its direction is more horizontal than "vertical", it does not mean that the structure must be completely horizontal, but can be slightly inclined.

In the description of the invention, "plurality" means at least two.

In the invention, unless otherwise clearly defined and limited, the terms "provided", "installed", "connected" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements. For those of ordinary skill in the art, the specific meaning of the above terms in the invention can be understood according to specific circumstances.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. A type of foot massage plate, comprising:

a bottom shell, an upper shell, a gear box, a power mechanism, first gear transmission mechanisms, and a second gear transmission mechanism, wherein the upper shell is mounted on the bottom shell by screws; the upper shell is provided with a mounting groove, and the gear box is installed in the mounting groove; the gear box is symmetrically provided with two first gear transmission mechanisms, and the middle part of the gear box is provided with a second gear transmission mechanism; the second gear transmission mechanism drives the two first gear transmission mechanisms to operate; the middle part of the lower end of the upper shell is rotatably provided with a transmission shaft, and the lower end of the upper shell is provided with a power mechanism; the transmission shaft extends into the mounting groove, then extends into the gear box and is connected to the second gear transmission mechanism; the power mechanism drives the second gear transmission mechanism to operate through the transmission shaft; the upper end of the upper shell is provided with a controller;

the first gear transmission mechanism comprises a fixing seat, U-shaped brackets, main gears, and massage rollers; the fixing seat is provided on the top of the gear box; the fixing seat is symmetrically provided with main gears, and the upper end of the main gear is provided with a rotating shaft; the fixing seat is symmetrically provided with shaft holes, and the main gear is rotatably connected to the shaft hole through the rotating shaft; the upper end of the main gear is provided with an eccentric circular groove; the upper end of the fixing seat is symmetrically provided with notches penetrating the fixing seat, and both sides of the shaft hole at the upper end of the fixing seat are symmetrically provided with sliding grooves; the U-shaped brackets are symmetrically arranged above the fixing seat; the lower end of the U-shaped bracket is provided with a circular shaft, and one end of the circular shaft extends from the corresponding notch to the corresponding eccentric circular groove; the lower end of the U-shaped bracket is symmetrically provided with limiting sliding bars, and the limiting sliding bars are slidably matched with the corresponding sliding grooves; the main gear drives the U-shaped brackets to reciprocate along the sliding grooves through the cooperation of the eccentric circular groove and the circular shaft; the upper end of the U-shaped bracket is rotatably provided with a massage roller.

2. The type of foot massage plate according to claim 1, wherein:

the second gear transmission mechanism comprises a middle gear and side gears; the middle gear is rotatably arranged in the middle of the top of the gear box, and the upper end of the transmission shaft is connected to the middle gear; both sides of the middle gear at the top of the gear box are symmetrically provided with side gears, and the side gears are rotatably connected to the gear box; the side gear on each side is meshed with the two main gears on the side corresponding to the fixing seat.

3. The type of foot massage plate according to claim 1, wherein:

the upper end of the upper shell is symmetrically provided with frame bodies, and both ends of the frame body are symmetrically provided with long-strip grooves penetrating the frame body; the two straight plates of the U-shaped bracket extend from the two long-strip grooves symmetrically arranged at the corresponding ends of the frame body; the massage rollers are located on the upper part of the frame body.

4. The type of foot massage plate according to claim 1, wherein:

the notches are located inside the shaft hole.

5. The type of foot massage plate according to claim 1, wherein:

the lower end of the main gear is rotatably connected to the bottom of the gear box.

6. The type of foot massage plate according to claim 1, wherein:

the power mechanism comprises a motor and a motor transmission worm gear; the motor transmission worm gear is installed at the lower end of the transmission shaft, and the motor is arranged at the lower end of the upper shell; the shaft of the motor is provided with a worm, and the worm is meshed with the motor transmission worm gear.

* * * * *